United States Patent [19]

Hamilton

[11] Patent Number: 5,086,582
[45] Date of Patent: Feb. 11, 1992

[54] SPOT SPRAYER FOR TALL WEEDS
[76] Inventor: Robert E. Hamilton, 14023 S. Red Top Rd., El Nido, Calif. 95317
[21] Appl. No.: 626,697
[22] Filed: Dec. 13, 1990
[51] Int. Cl.$^5$ ............................................. B05B 12/00
[52] U.S. Cl. ........................................................ 47/1.7
[58] Field of Search .................. 47/1.7, 1.43; 172/5-6; 239/78, 170

[56] References Cited
U.S. PATENT DOCUMENTS

| | | | |
|---|---|---|---|
| 3,959,924 | 6/1976 | Allen, Jr. ................... | 47/1.7 |
| 4,206,569 | 6/1980 | Randolph ................... | 47/1.7 |
| 4,257,190 | 3/1981 | Dykes ......................... | 47/1.7 |
| 4,709,505 | 12/1987 | Lempa, Jr. ................. | 47/1.7 |

Primary Examiner—Richard E. Chilcot, Jr.
Assistant Examiner—Michele A. Van Patten
Attorney, Agent, or Firm—Michael I. Kroll

[57] ABSTRACT

A spot sprayer for tall weeds in short crops is provided and consists of a housing affixed to a mechanized spray rig, a tank containing a liquid herbicide therein carried on the housing, a pump connected to the tank, a discharge tube extending from the pump, a spray nozzle at the distal end of the discharge tube and a mechanism carried on the housing for sensing the tall weeds in the short crops, so as to allow the pump to transfer a predetermined amount of the liquid herbicide from the tank through the discharge tube and exit the spray nozzle to only spray the tall weeds and kill them.

6 Claims, 2 Drawing Sheets

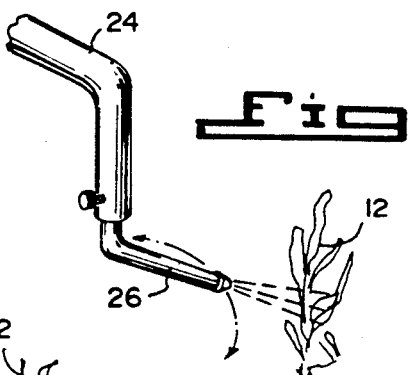
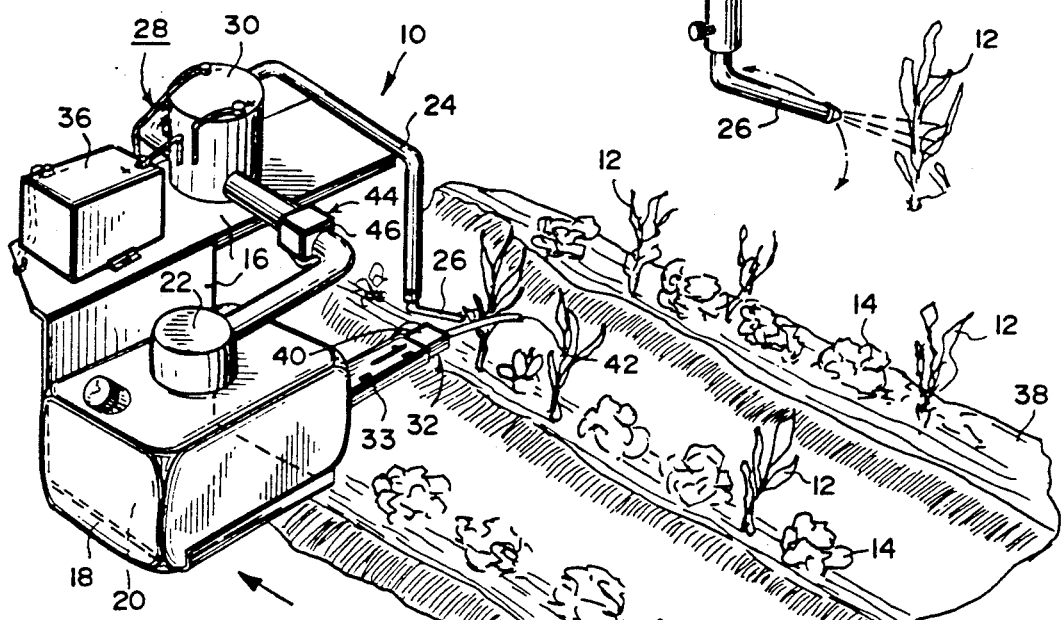
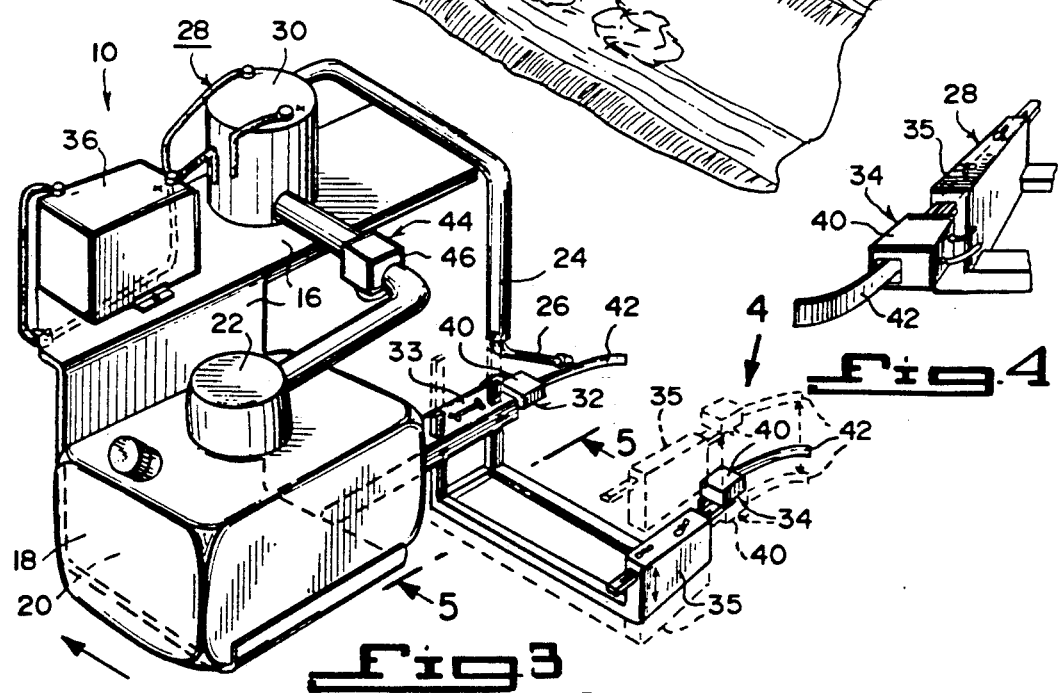

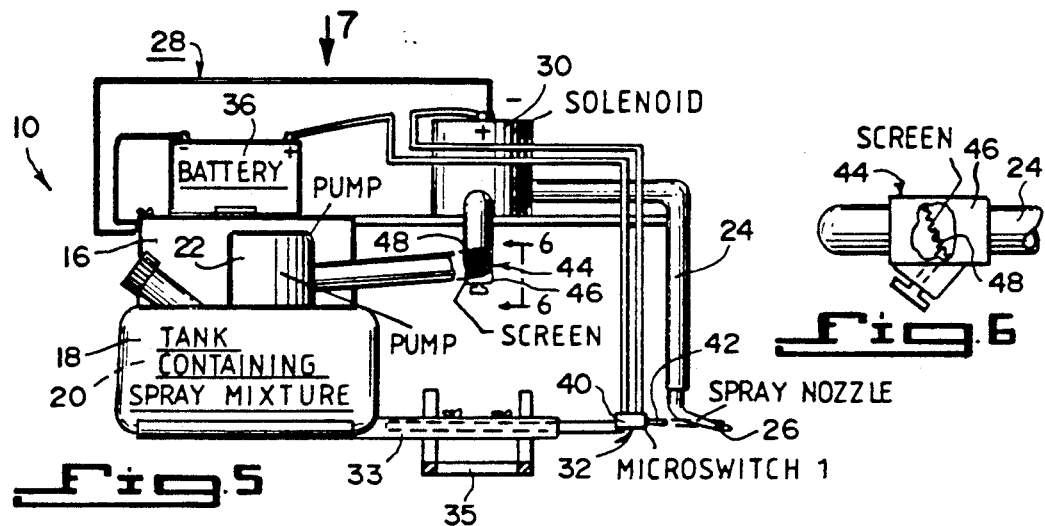
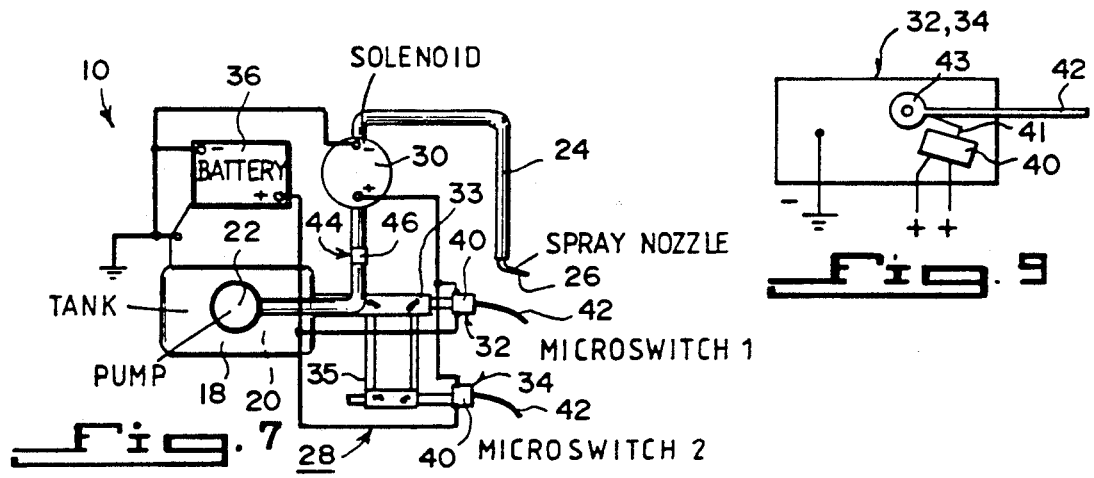
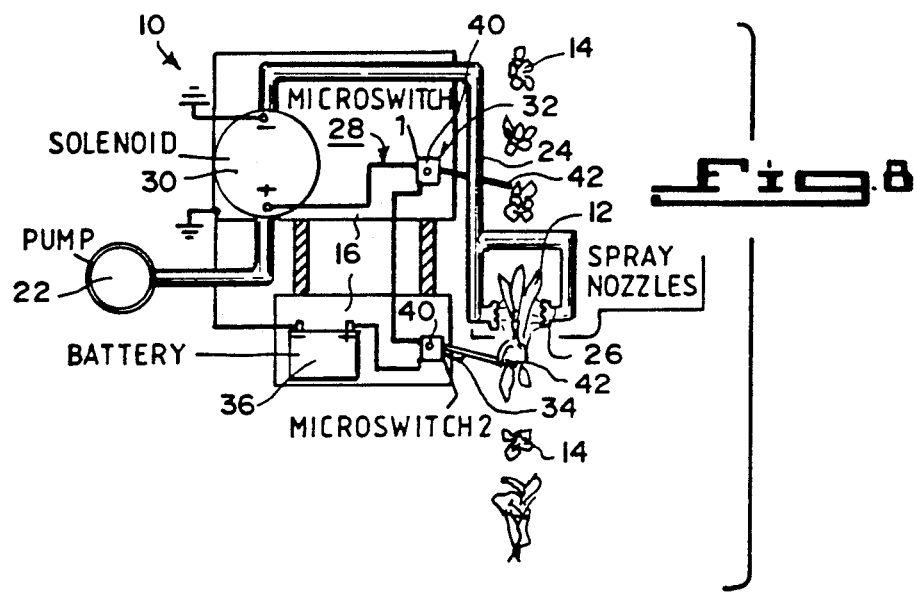

SPOT SPRAYER FOR TALL WEEDS

BACKGROUND OF THE INVENTION

1. Field of the Invention

The instant invention relates generally to weed spraying devices and more specifically it relates to a spot sprayer for tall weeds in short crops.

2. Description of the Prior Art

Numerous weed spraying devices have been provided in prior art that are adapted to produce fine jets of liquid herbicides that are discharged from pressurized containers to destroy the weeds. While these units may be suitable for the particular purpose to which they address, they would not be as suitable for the purposes of the present invention as heretofore described.

SUMMARY OF THE INVENTION

A primary object of the present invention is to provide a spot sprayer for tall weeds in short crops that will overcome the shortcomings of the prior art devices.

Another object is to provide a spot sprayer for tall weeds in short crops that includes sensors to be activated by the tall weeds to turn on and off spray nozzles on a mechanized spray rig so that the herbicides from the spray nozzles will only spray the tall weeds and kill them.

An additional object is to provide a spot sprayer for tall weeds in short crops that is more economical to use since only the tall weeds are sprayed and not the short crops.

A further object is to provide a spot sprayer for tall weeds in short crops that is simple and easy to use.

A still further object is to provide a spot sprayer for tall weeds in short crops that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention ready to be used with the second sensor removed therefrom.

FIG. 2 is an enlarged perspective view of the spray nozzle on the distal end of the discharge tube.

FIG. 3 is a perspective view of the instant invention with the second sensor in place.

FIG. 4 is a perspective view taken in direction of arrow 4 in FIG. 3 showing the second sensor in greater detail.

FIG. 5 is a cross sectional view taken along line 5—5 in FIG. 3.

FIG. 6 is an end view taken along line 6—6 in FIG. 5, showing the screen within a filter mechanism in greater detail.

FIG. 7 is a diagrammatic top view taken in direction of arrow 7 in FIG. 5.

FIG. 8 is a diagrammatic top view similar to FIG. 7 of a modification thereof.

FIG. 9 is a diagrammatic top view of the interior of one of the sensors in greater detail.

DETAILED DESCRIPTION OF THE PREFERRED EMBODIMENTS

Turning now descriptively to the drawings, in which similar reference characters denote similar elements throughout the several views, the Figures illustrate a spot sprayer 10 for tall weeds 12 in short crops 14 consisting of a housing 16 affixed to a mechanized spray rig (not shown). A tank 18 containing a liquid herbicide 20 therein is carried on the housing 16. A pump 22 is connected to the tank 18, while a discharge tube 24 extends from the pump 22 and a spray nozzle 26 is at the distal end of the discharge tube 24. A mechanism 28 is carried on the housing 16 for sensing the tall weeds 12 in the short crops 14, so as to allow the pump 22 to transfer a predetermined amount of the liquid herbicide 20 from the tank 18 through the discharge tube 24 and exit the spray nozzle 26 to only spray the tall weeds 12 and kill them.

The sensing mechanism 28 includes a solenoid 30 in the discharge tube 24 and is carried on the housing 16. A first sensor 32 is carried on the housing 16 by a first bracket 33 and is proximate to the spray nozzle 26. A second sensor 34 is carried on the housing 16 by a second bracket 35 and is spaced away from the first sensor 32. A battery 36 is electrically connected between the solenoid 30, the first sensor 32 and the second sensor 34, so that when the mechanized spray rig moves along and above the ground 38 the first sensor 32 will make contact with a tall weed 12 and activate the solenoid 30 to allow the liquid herbicide 20 to pass through the discharge tube 24 and exit the spray nozzle 26, whereby the second sensor 34 will make contact with the tall weed 12 and deactivate the solenoid 30 to stop the liquid herbicide 20 from passing through the discharge tube 24.

The first sensor 32 and the second sensor 34, each include a microswitch 40 having an actuating arm 41. The microswitch 40 is electrically connected between the solenoid 30 and the battery 36. An activating lever 42 on a bearing 43, extends outwardly therefrom proximate the actuating arm 41 to make contact with the tall weed 12 to operate the microswitch 40. A filter mechanism 44 is in the discharge tube 24 between the pump 22 and the solenoid 30 to clean the liquid herbicide 20 passing therethrough. The filter mechanism 44 includes a casing 46 with a screen 48 therein to remove any foreign particles from the liquid herbicide 20.

The spray nozzle 26, the first sensor 32 and the second sensor 34 are adjustable to compensate for different sized tall weeds 12 to be sprayed with the liquid herbicide 20. The spray nozzle 26, as shown in FIGS. 1, 2, 3, 5 and 7 is of a single head configuration, while the spray nozzle 26, as shown in FIG. 8 is of a double head configuration.

LIST OF REFERENCE NUMBERS 10 spot sprayer 10
12 tall weeds
14 short crops
16 housing
18 tank
20 liquid herbicide
22 pump
24 discharge tube
26 spray nozzle 28 sensing mechanism
30 solenoid
32 first sensor
33 first bracket
34 second sensor
35 second bracket
36 battery
38 ground
40 microswitch
41 actuating arm in 40
42 activating lever
43 bearing on 42
44 filter mechanism
46 casing
48 screen It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A self contained spot sprayer for tall weeds in short crops, comprising:
   a) a housing affixed to a mechanized sprayer;
   b) a tank containing a liquid herbicide therein carried on said housing;
   c) a pump connected to said tank;
   d) a discharge tube extending from said pump;
   e) a spray nozzle at the distal end of said discharge tube; and
   f) a means, carried on said housing, for sensing the tall weeds in the short crops, so as to allow said pump to transfer a predetermined amount of the liquid herbicide form said tank through said discharge tube and exit said spray nozzle to spray the tall weeds and kill them, said sensing means including a solenoid in said discharge tube and carried on said housing and a first sensor carried on said housing and proximate to said spray nozzle and a second sensor carried on said housing and spaced away from said first sensor and a battery electrically connected between said solenoid, said first sensor and said second sensor so that when the mechanized spray rig moves along and above the ground said first sensor will make contact with a tall weed and activate said solenoid to allow the liquid herbicide to pass through said discharge tube and exit said spray nozzle, said second sensor will make contact with the tall weed and deactivate said solenoid to stop the liquid herbicide from passing through said discharge tube, said first sensor and said second sensor each including a microswitch having an actuating arm, whereby said microswitch is electrically connected between said solenoid and said battery and an activating lever on a bearing extending outwardly therefrom proximate the actuating arm to make contact with the tall weed, so as to press in the actuating arm and operate said microswitch.

2. A spot sprayer as recited in claim 1, further including a filter mechanism in said discharge tube between said pump and said solenoid to clean the liquid herbicide passing therethrough.

3. A spot sprayer as recited in claim 2, wherein said filter mechanism includes a casing with a screen therein to remove any foreign particles from the liquid herbicide.

4. A spot sprayer as recited in claim 3, wherein said spray nozzle, said first sensor and said second sensor are adjustable to compensate for different sized tall weeds to be sprayed with the liquid herbicide.

5. A spot sprayer as recited in claim 4, wherein said spray nozzle is of a single head configuration.

6. A spot sprayer as recited in claim 4, wherein said spray nozzle is of a double head configuration.

* * * * *